(12) United States Patent
Collins et al.

(10) Patent No.: US 7,794,636 B2
(45) Date of Patent: Sep. 14, 2010

(54) METHODS TO PRODUCE AN OBJECT THROUGH SOLID FREEFORM FABRICATION

(75) Inventors: David C Collins, Philomath, OR (US); Laura Kramer, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1850 days.

(21) Appl. No.: 10/461,022

(22) Filed: Jun. 13, 2003

(65) Prior Publication Data

US 2004/0251574 A1    Dec. 16, 2004

(51) Int. Cl.
*B27N 5/00* (2006.01)
*B29C 41/02* (2006.01)

(52) U.S. Cl. ..................................... 264/113
(58) Field of Classification Search ................. 264/113, 264/308
See application file for complete search history.

(56) References Cited

U.S. PATENT DOCUMENTS

| | | | |
|---|---|---|---|
| 5,204,055 A * | 4/1993 | Sachs et al. ............. | 264/113 X |
| 5,622,216 A | 4/1997 | Brown | |
| 5,738,817 A | 4/1998 | Danforth et al. | |
| 5,893,404 A | 4/1999 | Mendez et al. | |
| 5,900,207 A | 5/1999 | Danforth et al. | |
| 6,375,874 B1 * | 4/2002 | Russell et al. ............. | 264/113 X |
| 6,799,959 B1 * | 10/2004 | Tochimoto et al. .......... | 425/130 |

* cited by examiner

*Primary Examiner*—Leo B Tentoni

(57) ABSTRACT

A method for producing an object formed through solid freeform fabrication includes dispensing a binder on successive layers of build material with a single first dispensing member; and coloring the successive layers with at least one second dispensing member, where the second dispensing member over-dispenses the first dispensing member. Another method for producing an object through solid freeform fabrication includes dispensing a first binder on successive layers of build material with a single first dispensing member; and dispensing a second binder on the successive layers of build material with at least one second dispensing member, where the second dispensing member over-dispenses the first dispensing member.

6 Claims, 5 Drawing Sheets

METHODS TO PRODUCE AN OBJECT THROUGH SOLID FREEFORM FABRICATION

BACKGROUND

Solid freeform fabrication is fast becoming a popular process for manufacturing three-dimensional objects including prototype parts, models, production pieces and working tools. Solid freeform fabrication is a process in which an object, which is described by electronic data, is automatically built from build materials. A principal form of solid freeform fabrication involves a selective deposition process.

When solid freeform fabrication uses a selective deposition process, a number of fabricated planar layers are combined together to form a three-dimensional object. Layers are fabricated by, for example, dispensing or ejecting a binder onto a build material, such as a flat bed of powder or slurry. Where the binder is ejected, the build material is solidified into a cross section of the object being formed. This fabrication is performed layer-by-layer, with each subsequent layer representing a subsequent cross section of the final desired product. Adjacent layers are adhered to one another in predetermined patterns to build up the desired product. Alternatively, freeform fabrication may be performed by selectively ejecting a build material layer-upon-layer to form the desired product.

In addition to selectively forming each layer of the desired object from the build material in the fabrication chamber, the system can apply a color or a color pattern to each layer of the object. For example, inkjet printing technology, such as drop-on-demand technology, can be employed in which a number of differently colored inks are selectively ejected from the nozzles of a dispensing member and blended on the receiving medium to provide a full spectrum of colors. On each individual layer, conventional two-dimensional multi-pass printing techniques and half-toning algorithms can be used to hide dispensing system defects and achieve a broad range of desired color hues.

However, the application of two-dimensional dispensing techniques to three-dimensional solid freeform fabrication fails to properly account for the third dimension and causes several undesirable results. In particular, the multiple dispensing members may become misaligned. This member-to-member misalignment causes vertical roughness along the vertical surfaces of the object being fabricated in a solid freeform fabrication system. In addition to the vertical surface roughness, the member-to-member misalignment results in inaccurate dimensions in the final object. Moreover, when multiple colors are dispensed from different dispensing members, the member-to-member misalignment causes a color-to-color misalignment resulting in color hue shift that is particularly noticeable on vertical surfaces of the fabricated object.

SUMMARY

In one of many possible embodiments, the present specification describes a method for producing an object formed through solid freeform fabrication includes dispensing a binder on successive layers of build material with a single first dispensing member; and coloring the successive layers with at least one second dispensing member, where the second dispensing member over-dispenses the first dispensing member.

Another method for producing an object through solid freeform fabrication includes dispensing a first binder on successive layers of build material with a single first dispensing member; and dispensing a second binder on the successive layers of build material with at least one second dispensing member, where the second dispensing member over-dispenses the first dispensing member.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

The specification describes techniques for fabricating an object by a solid freeform fabrication system that uses selective dispensing technology. The vertical surfaces of objects formed by these techniques exhibit reduced color hue shifting, reduced surface roughness, and improved dimensional accuracy.

Figure 1:
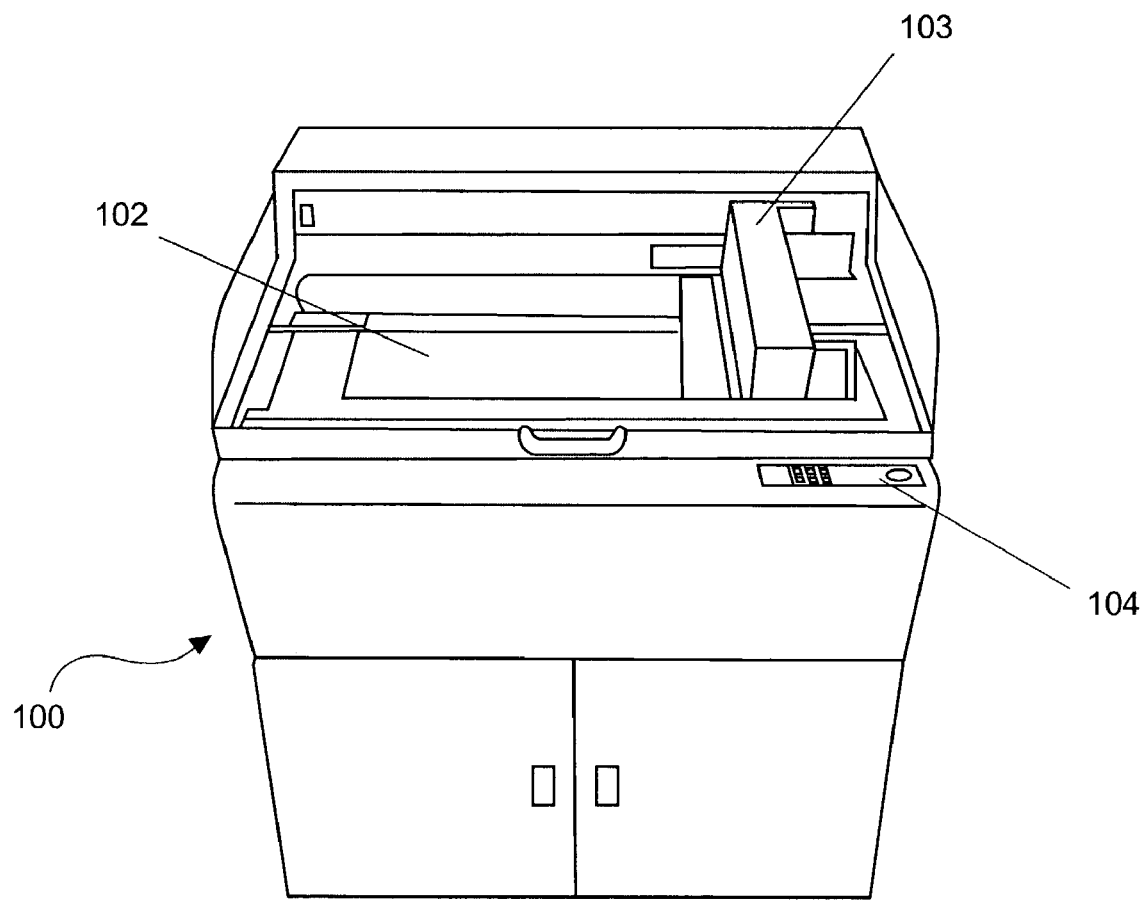
FIG. 1 illustrates a solid freeform fabrication system that uses a selective dispensing process to fabricate the desired products. Various examples of the principles described herein can be implemented in the system illustrated in FIG. 1.

FIG. 1 illustrates a solid freeform fabrication system that uses selective dispensing technology. In the solid freeform fabrication system (100) of FIG. 1, a build material such as a powder or slurry is used to form each individual layer of the desired product. To do this, a measured quantity of build material is first provided from a supply chamber. For simplicity, we will describe the build material as a powder.

A roller or spreader, preferably incorporated into a moving stage (103), then distributes and compresses the powder at the top of a fabrication chamber (102) to a desired thickness. Then, the dispensing member (103) deposits binder onto the powder in the fabrication chamber (102) in a two dimensional pattern. This two dimensional pattern is a cross section of the desired product. The dispensing member (103) may also eject ink, toner or color activator into the layer of powder to provide a desired color or color pattern for each cross section of the desired product.

The powder becomes bonded in the areas where the binder is deposited, thereby forming a layer of the desired product. The process is repeated with a new layer of powder being applied over the top of the previous layer in the fabrication chamber (102). The next cross section of the desired product is then fabricated by dispensing binder onto the new powder layer. The binder also serves to bind the adjacent or successive layers of the desired product together.

This process continues until the entire object is formed within the powder bed in the fabrication chamber (102). The extra powder that is not bonded by the binder is then brushed away leaving the object. A user interface or control panel (104) is provided to allow the user to control the fabrication process.

Such a fabrication process offers the advantages of speed and low materials cost. It is considered one of the fastest solid freeform fabrication methods, and can be performed using a variety of colors.

The dispensing system (103) in the solid freeform fabrication system (100) often includes inkjet technology, such as drop-on-demand technology, for dispensing color into the layers of the desired object. In inkjet technology, the dispensing member ejects drops of ink in a selective pattern to create the image, or in the case of solid freeform fabrication, to color the object. As used herein and in the attached claims, the term "ink" is used broadly to mean any substance ejected by a dispensing member to color an object being fabricated. Consequently, the term "ink" includes, but is not limited to, ink, printing fluid, toner, colorant, binder, etc.

In solid freeform fabrication systems that include selective dispensing technology, the dispensing system (103) that releases the binder and ink comprises a plurality of dispensing members through which the ink and/or binder are released onto the powder. To provide a variety of colors to objects produced via solid freeform fabrication, two-dimensional printing techniques are typically employed with a plurality of dispensing members. Principles such as half-toning and dithering can be used in solid freeform fabrication to provide many apparent colors from relatively few colors of ink released from the plurality of dispensing members. The apparent color is the color that is seen by an observer viewing the three-dimensional object.

In typical inkjet printing systems, only a few colors are used and mixed in various ratios as desired to produce the full spectrum of colors. For example, these colors may be yellow (Y), cyan (C) and magenta (M). Sometimes a supply of black (K) ink may also be used. When the colors are blended on the receiving medium in various ratios, virtually any desired color can be produced. This process of blending base colors to produce other colors is sometimes referred to as half-toning. Similar principles can be used to create a full spectrum of colors on an object being fabricated through solid freeform fabrication.

The process of blending the various base colors relies on the system's ability to properly align the various dispensing members in the dispensing system. In a two-dimensional image, misalignment results in discoloration of the image, especially at the edges. For example, the base colors of cyan and magenta would be blended to create an image of a uniform blue color. If the dispensing members were misaligned, however, the center of the image would appear slightly discolored while the edges of the image would be cyan on one side and magenta on the other side.

The problems associated with dispensing member misalignment in two-dimensional images (i.e., the edges of the image exhibit color hue shifting due to the misalignment) are exacerbated in solid freeform fabrication techniques that work in three dimensions. In three-dimensional objects formed through solid freeform fabrication techniques the vertical surfaces are formed by the edges of each individual layer. The edges of each layer will experience a color hue shift due to member-to-member misalignment and improper blending at the edges causing the object to have the wrong surface color.

Figure 2:
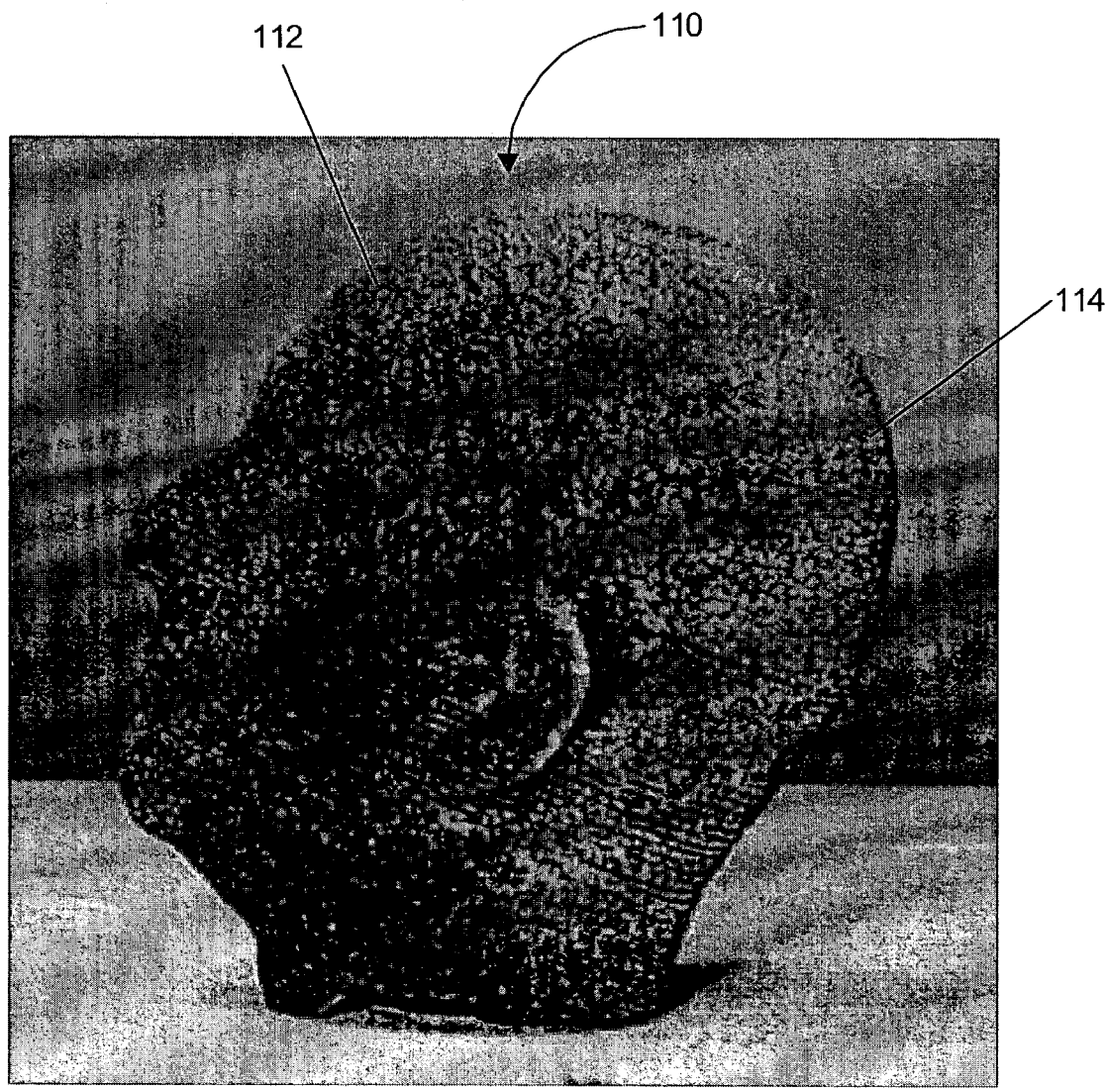
FIG. 2 illustrates an embodiment in which the color hue shift is caused by member-to-member misalignment.

An example of this color hue shift is shown in FIG. 2. The three-dimensional object (110) formed through solid freeform fabrication techniques is intended to be a uniform blue color produced by blending cyan (C) and magenta (M). However, because of the misalignment of the dispensing members within the dispensing system, there is a magenta region (112) and a cyan region (114).

Figure 3:
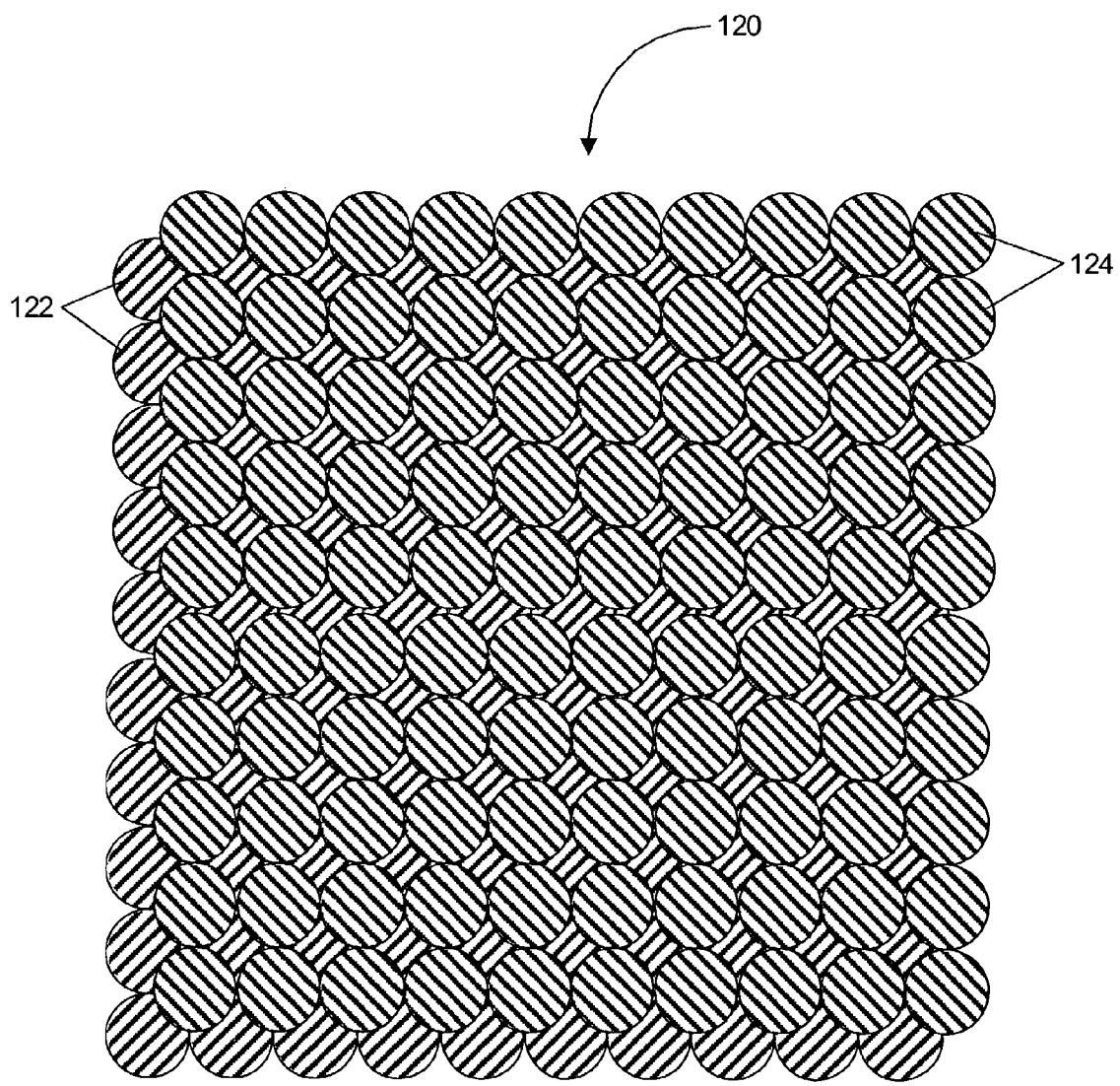
FIG. 3 illustrates a conceptual view of a single layer cross section of embodiment which has an object fabricated by a rapid prototype system with color hue shift caused by member-to-member misalignment.

FIG. 3 is a conceptual view of a cross section of the object (110) in FIG. 2. The cross section (120) shown in FIG. 3 is square-shaped and is a representative cross section of objects formed through solid freeform fabrication techniques with misaligned dispensing members. One of ordinary skill in the art will recognize that objects of all shapes and configurations can be produced through solid freeform fabrication techniques.

The conceptual view in FIG. 3 illustrates why the object (110) in FIG. 2 exhibits two differently colored regions (112, 114). The cross section (120) in FIG. 3 is formed by depositing drops of binder and differently colored ink in a plurality of predetermined locations to form the cross sectional layer of the object. Magenta colored binder/ink drops are shown as circles with upwardly sloping lines (122) while cyan colored binder/ink drops are shown as circles with downwardly sloping lines (124). The two sets of drops are distinguishable from each other because the dispensing members were misaligned. The cross section (120) exhibits a magenta color on the left and bottom edges while exhibiting a cyan color on the top and right edges. The desired blue color is exhibited where the two colors overlap but at the edges there is no overlap because of the misalignment. With reference to FIG. 2, when several of the cross sections are stacked to form the object (110), the blue color is hidden and only the hue shifted magenta (112) and cyan (114) regions are visible to an observer. The misaligned dispensing members produce objects with undesired, hue-shifted colors. Additionally, the misaligned dispensing members result in rough surfaces and inaccurate dimensions.

It is possible to prevent or minimize the color hue shift at the edges of the object by defining the object borders with a single dispensing member and by dispensing the colored ink beyond the borders of the object.

Figure 4:
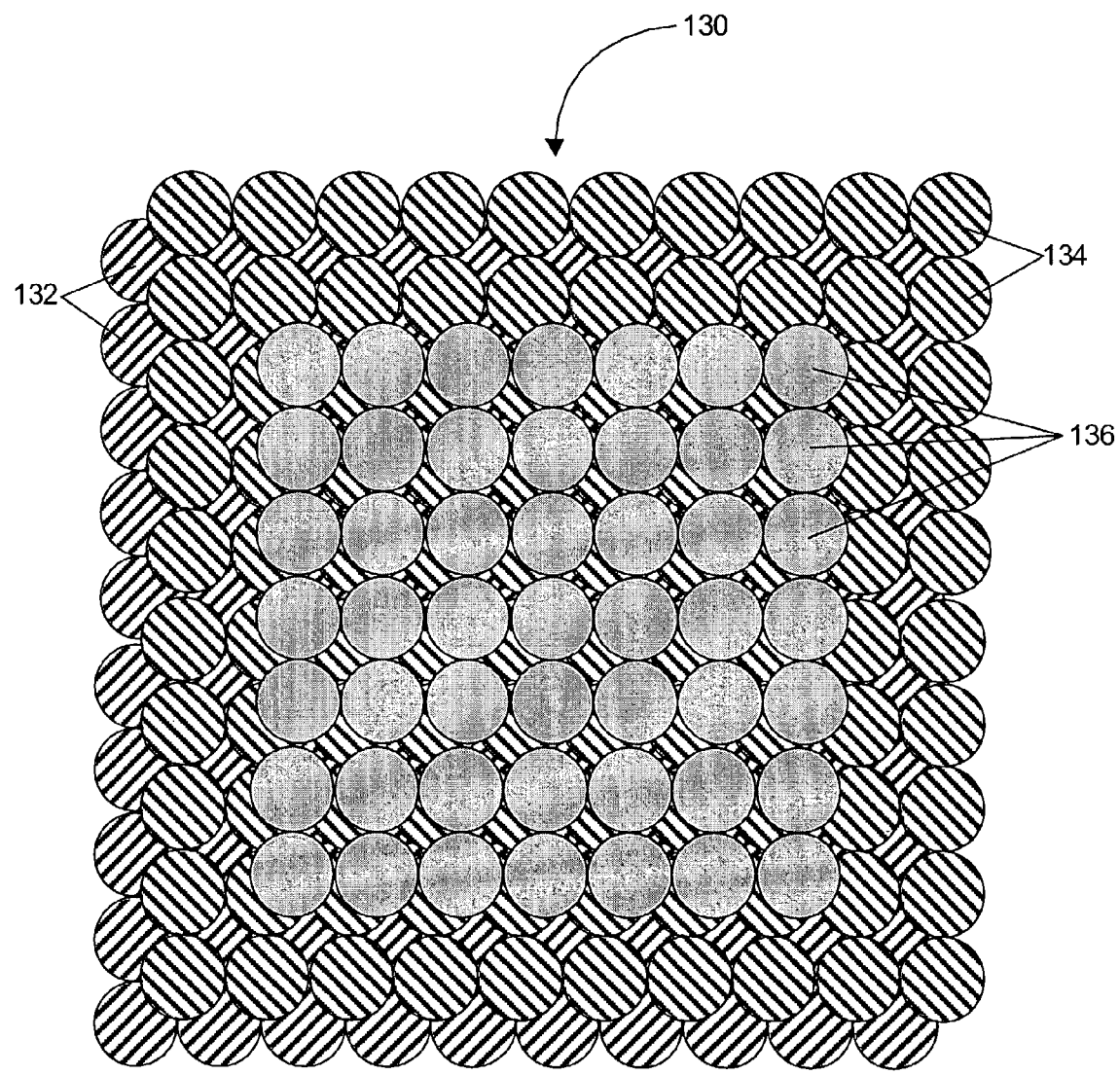
FIG. 4 illustrates a conceptual view of a single layer cross section of an embodiment which has an object fabricated by a rapid prototype system according to principles described herein.

FIG. 4 illustrates a cross sectional layer (130) of an object formed according to principles described herein. The drops of binder (136) are ejected from a single first dispensing member and the drops of ink (132, 134) are ejected from a second dispensing member. The second dispensing member should be understood to mean at least one dispensing member while it may comprise more than one dispensing member. In this method, the coloring of the object is performed by the second dispensing members, which over-dispenses the single first dispensing member. Over-dispensing is when the second dispensing member dispenses to cover an area larger than the area covered by the single first dispensing member, as shown in FIG. 4.

In one example, a binder is released from the single first dispensing member and inert ink is released from the at least one second dispensing member. In this example, the binder is a one part binder released from the first dispensing member. As described above, the first dispensing member releases binder (136) in the area that forms the cross-sectional layer of the object and the second dispensing members ejects ink (132,134) and over-dispenses the first dispensing member. In this example, the ink released from the second dispensing member does not cooperate in the binding of the powder material. According to this example, the first dispensing member forms a bound region in each successive cross sectional layer to form the object. Because there can be no member-to-member misalignment when only one dispensing member is used to facilitate binding, the edges of the object will be smooth. Additionally, because the second dispensing members over-dispense the first dispensing member, the color extends beyond the borders of the object so that the undesired color hue shifting occurs in powder that does not make up part of the object.

In this example, the binder may include a UV curable resin. Such UV curable resins include those resins and methods described in U.S. patent applications US2002/0008333 and US2002/0016386. The disclosures of these applications are incorporated entirely herein by reference. When UV curable resins are used, the resin is deposited on the powder material. Then, before depositing the next layer of powder, the object is exposed to UV energy to facilitate curing. The ink used in this example is dependent on the resin selected for use as the binder. One of skill in the art will recognize that the surfactants and pigments can be selected to comprise a solvent system in which the binder will mix. One of ordinary skill in the art can select a solvent system that is stable and mixes well with the binder selected.

Alternatively, this aspect of the invention may utilize principles of polyelectrolyte chemistry to form the solid object. For example, the powder material may comprise a cationic polyelectrolyte that reacts with an anionic polyelectrolyte in the binder to form a solid object. By way of example and not by limitation, such cationic polyelectrolyte powders may include poly(ethylene imine) or poly(vinyl pyridine). Also, the anionic polyelectrolyte may include water-based polyelectrolytes such as poly(acrylic acid) or poly(methacrylic acid). The ink would not contain a polyelectrolyte and would not react with the powder or the binder. The ink may be water-based to encourage mixing with the anionic polyelectrolyte binder in the region where the object is formed.

FIG. 4 also represents a method for forming the cross-sectional layers where a two-part binder is used. A first binder may be released from the single first dispensing member and a second binder may be released from the second dispensing member. The first and second binders may act as a two-part binder to cooperatively bind the powder in each successive layer to form the object. In the regions in which the first and the second binder are both present, the powder is bound and forms the desired object. However, the powder remains loose where it is only contacted by the first or second binder. The second dispensing members over-dispense the first dispensing member, meaning that the second dispensing member will release the second binder beyond the region defined by the first dispensing member as the borders of the object. In FIG. 4, this is shown by the filled-in circles (136) representing the placement of the first binder ejected by the single first dispensing member and the upward circles (132) and downward circles (134) representing the second binder ejected by the second dispensing member.

Because the borders of the object are defined by the presence of both the first and the second binder, the object will only be formed where the first dispensing member prints. The first dispensing member is a single dispensing member not subject to the problems of member-to-member misalignment. Therefore, the borders of the object will be clearly defined on each layer eliminating the problem of rough surfaces on the three dimensional objects. As seen in FIG. 4, the edge effects of member-to-member misalignment occur in regions not pertaining to the object defined by the single first dispensing member.

Additionally, the second binder released from the second dispensing member may comprise an ink to selectively color the object being formed. When the second dispensing member releases differently colored inks, half toning and other techniques can be used to produce a variety of colors. Because the second dispensing member over-dispenses the first dispensing member, the undesired color hue shifting that is most visible at the edges will not affect the surface color of the object. FIG. 4 shows that the ejections (136) from the first dispensing member define the borders of the object while the ejections from the second dispensing members (132, 134) over-dispense the borders so that the hue shifted edges are not part of the finished object.

In this example, where a two-part binder is used, the binder can be any of a variety of two component materials that react upon contact to form a solid object. Two-part epoxies, two-part urethanes, two-part silicones, and oppositely charged polyelectrolytes are common examples of such materials. One of ordinary skill in the art will recognize that other two-component binder materials can be selected for use. One of ordinary skill in the art will also recognize that a variety of epoxies, urethanes, silicones, and polyelectrolytes could be used as the two-part binder and would be able to select the proper materials for any specific application.

Figure 5:
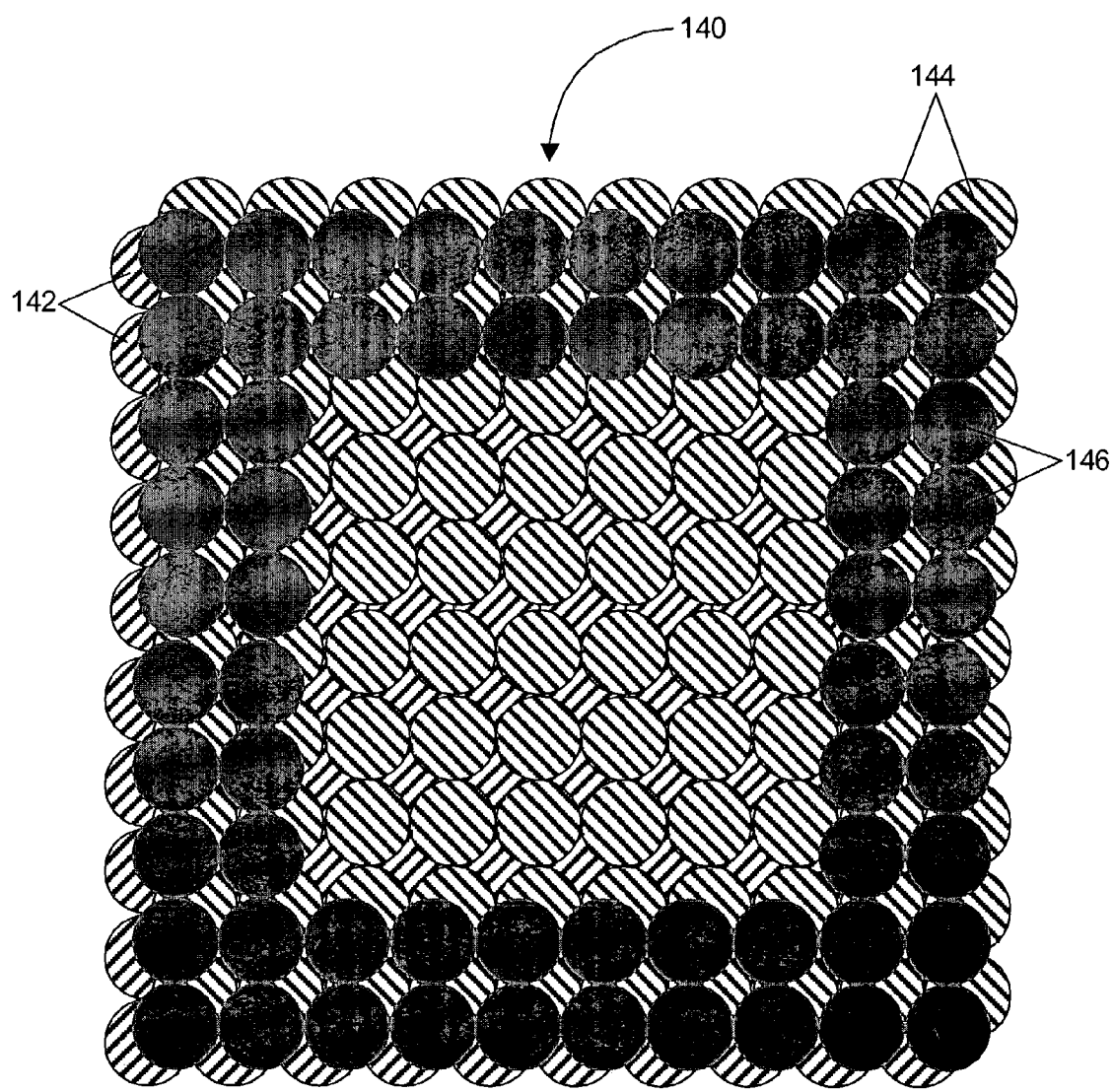
FIG. 5 illustrates a conceptual view of a single layer cross section of an embodiment which has an object fabricated by a rapid prototype system according to principles described herein.

As seen in FIG. 5, a releaser (146) is dispensed on successive layers of powdered material by a single first dispensing member. Additionally, a binder (142,144) is dispensed on the successive layers by a second dispensing member. In this example, the binder (142,144) is used to bind regions of powdered material within each layer and the releaser is used to define the borders of the object within the bound regions. The second dispensing member over-dispenses the first dispensing member, similar to the other examples herein, in that the second dispensing member deposits material to cover an area larger than the desired object. FIG. 5 shows a conceptual cross sectional layer of an object formed according to these principles. From this figure, it can be seen that the at least one second dispensing member over-dispenses the object border as defined by the single first dispensing member.

The dispensing of the releaser may occur prior to, or subsequent to, the dispensing of the binder. If the releaser is dispensed prior to the binder, the releaser acts as an inhibitor to prevent the binder from binding the powder in the region covered by the single first dispensing member. Because the first dispensing member defines the border of the object within the area printed by the second dispensing member, the member-to-member edge effects are not visible in the finished article. The binder may also comprise differently colored inks to selectively color the object. The surface roughness and color hue shifting resulting from misaligned dispensing members will occur in the powder beyond the area defining the object.

If the releaser is dispensed subsequent to the dispensing of the binder, the releaser acts as a dissolver to dissolve the powder that was previously bound by the binder. In such an example, the second dispensing member dispenses over an area larger than the area of the object and the single first dispensing member deposits releaser to define the borders of the desired object. The single first dispensing member is not subject to member-to-member misalignment and therefore the borders of the object can be clearly defined. The surface roughness and the color hue shifting caused by member-to-member misalignment in the at least one second dispensing member occurs in areas that do not comprise the cross sectional layers that form the object.

In this example using a binder and a releaser, the binder and releaser are immiscible. The use of the term "immiscible fluid" is intended to indicate that the two fluids tend to repel one another and to minimize any area of contact between bodies of the two fluids. The binder may be an aqueous or water-based solution, although this is not necessarily so.

According to some embodiments, the binder is about 20-100% water, preferably about 60-95% water. The release fluid may be an oil or other fluid that is immiscible with the binder. For example, if the binder is water-based, the release fluid may include, but is not limited to: silicone oils, non-polar hydrocarbons (preferably those that are non-volatile at room temperatures), chlorinated solvents, and liquid fluorocarbons. Silicone oils may be particularly useful because of their benignity, but any two immiscible fluids may be used. However, if the binder is a non-aqueous substance, then the release fluid may be some other fluid which: (a) does not react with the powder (i.e. does not bind powder particles together), and (b) is immiscible with the binder. Thus, selection of the release fluid is dependent on the nature of the powdered material and binder used.

The binder and releaser are not limited, however, to the material sets described above. Any two fluids may possibly be used, provided that the binder does indeed bind the powdered material in an acceptable manner and that the releaser precludes binding of the powdered material. The binder and releaser may be grouped with a powdered material to form a material set for use in solid freeform fabrication systems.

In one system according to the principles described herein, the solid freeform fabrication system, such as the one shown in FIG. 1, comprises a fabrication chamber (102) for holding a bed of powdered based material, a spreader (103) for distributing successive layers of powdered build material, and a dispensing system for selectively ejecting binder and differently colored inks into each layer of powdered build material. The dispensing system may comprise a single first dispensing member to define the borders of the object and at least one second dispensing member that over-dispenses the first dispensing member. The second dispensing member may also color the object. The first dispensing member may eject binder while the second dispensing member ejects ink.

In another example, the dispensing system comprises a single first dispensing member and at least one second dispensing member that over-dispenses the first dispensing member. In this example, the first dispensing member ejects a first binder while the second dispensing member ejects a second binder. The first and second binder may cooperate to bind the powdered material. Additionally, the second binder may comprise differently colored inks.

In yet another example, the single first dispensing member ejects a releaser rather than a binder. In this example, the second dispensing member ejects a binder and over-dispenses the first dispensing member. The second dispensing member may also selectively eject differently colored inks together with the binder. The first dispensing member may deposit releaser before the second dispensing member deposits the binder, or the first dispensing member may deposit releaser after the second dispensing member deposits the binder. In either case, the principles of the present specification are followed so that the second dispensing member over-dispenses the first dispensing member such that the first dispensing member defines the borders of the object.

What is claimed is:

1. A method for producing an object formed through solid freeform fabrication, said method comprising:
    dispensing a binder on successive layers of build material with a single first dispensing member; and
    coloring said successive layers with at least one second dispensing member, wherein the second dispensing member over-dispenses the first dispensing member.

2. The method of claim 1, wherein the at least one second dispensing member dispenses an ink.

3. The method of claim 2, wherein the ink does not bind the build material.

4. The method of claim 1, wherein the binder dispensed from the first dispensing member further comprises an ink.

5. The method of claim 1, wherein the first dispensing member releases a binder further comprising an ink, and wherein the at least one second dispensing member releases an ink.

6. The method of claim 5, wherein a bound region is formed where the first binder is dispensed on a layer of build material.

* * * * *